United States Patent [19]

Kalman et al.

[11] 4,445,081
[45] Apr. 24, 1984

[54] LEADING POWER FACTOR INDUCTION MOTOR DEVICE

[75] Inventors: Gabor Kalman, Palos Verdes; Graham W. McLean, Torrance, both of Calif.

[73] Assignee: The Garrett Corporation, Los Angeles, Calif.

[21] Appl. No.: 331,108

[22] Filed: Dec. 15, 1981

[51] Int. Cl.³ .............................................. H02P 5/40
[52] U.S. Cl. ................................... 318/832; 318/737
[58] Field of Search .............. 318/732, 737, 754, 703, 318/809, 803, 826, 332, 730, 49; 323/201–205, 207; 363/71, 72

[56] References Cited

U.S. PATENT DOCUMENTS

| | | |
|---|---|---|
| 464,671 | 12/1891 | Blathy . |
| 514,903 | 2/1894 | Bradley . |
| 606,056 | 6/1898 | Hassler . |
| 1,313,102 | 8/1919 | Mac . |
| 1,627,330 | 5/1927 | Hineline . |
| 1,628,464 | 5/1927 | Hobart . |
| 2,444,077 | 6/1948 | Weathers . |
| 2,477,424 | 7/1949 | Schweitzer, Jr. . |
| 2,935,673 | 5/1960 | Herold et al. . |
| 3,017,553 | 1/1962 | Homan . |
| 3,144,597 | 8/1964 | Lee . |
| 3,339,131 | 8/1967 | Hoel . |
| 3,444,450 | 5/1969 | Koppelmann ...................... 318/813 |
| 3,519,909 | 7/1970 | Mathias et al. . |
| 3,549,968 | 12/1970 | Shibata ................................ 318/732 |
| 3,551,767 | 12/1970 | Shibata ................................ 318/732 |
| 3,792,286 | 2/1974 | Meier ................................... 318/810 |
| 4,030,006 | 6/1977 | Elger ................................... 318/732 |

Primary Examiner—David Smith, Jr.
Attorney, Agent, or Firm—John H. Lynn; Leslie S. Miller; Albert J. Miller

[57] ABSTRACT

A variable-speed, leading power factor AC machine which may be supplied through a line-commutated inverter.

13 Claims, 12 Drawing Figures

LEADING POWER FACTOR INDUCTION MOTOR DEVICE

BACKGROUND OF THE INVENTION

This invention relates generally to rotating electrical machinery and more particularly to a leading power factor induction motor drive system.

Induction and synchronous motors are essentially constant speed electrical machines. Many industrial, military and traction applications, however, require electric drives with wide speed variations. The requirement of having a wide operating speed range prevented both synchronous and induction alternating current motors from being practical for wide speed range variable speed drives until the recent advent of high-power, solid-state electronic components which have been used to construct line and forced-commutated inverters for variable-voltage, variable-frequency power supplies for AC motor drives. Yet today, even the most successful AC motor drives cannot compete, in terms of initial cost, with traditional DC motor drives used in most variable speed motor applications. The reason for the high cost of AC motor drive systems is that the least expensive inverter, the line-commutated type, and the least expensive motor, the squirrel-cage induction type, are fundamentally incompatible in terms of their reactive power requirements.

A characteristic of AC circuits is that the corresponding voltage and current waveforms are not always in phase. The product of the out-of-phase voltage and current components is generally referred to as reactive power or reactive volt-ampere. When the phase of the current lags or leads the voltage, the corresponding power factor is referred to as a lagging power factor or a leading power factor, respectively.

AC induction motors typically operate at a lagging power factor, while line-commutated inverters can function only if the load they supply has a leading power factor. A static inverter, which is capable of supplying lagging power factor loads, must have auxiliary means to force the commutation of the solid-state switching devices which comprise the inverter; hence the name forced-commutated inverter also referred to as self-commutated inverter. The requirement for separate commutation circuitry makes the forced-commutated inverter significantly more expensive than a line-commutated inverter having a comparable power rating.

Synchronous motors are capable of operating at a leading power factor and, therefore, are compatible with line-commutated inverters. Below a minimum speed, however, synchronous machines fail to generate sufficient voltage to line-commutate the thyristors in the inverter, which necessitates a special start mode for such machines. In the past, two methods have been used to start synchronous motors operated in conjunction with line-commutated inverters. One method is to provide motor starting by means of a forced-commutated inverter that operates only at low speeds when the motor is being started and is disconnected once the speed is sufficiently high to assure line-commutation. A second method is to selectively pulse current into sets of the synchronous machine winding through the inverter, which causes the machine to accelerate until reaching a speed where the generated voltage is sufficient for line-commutation. In the second starting mode, inverter commutation is achieved by quenching the current in the DC link. The shortcomings of the two foregoing methods of starting a synchronous motor are that the first method requires a separate forced-commutated inverter and that the second method produces a relatively low starting torque. The low starting torque results from limitations on the amount of pulse-power that can be transferred through the DC link. In some applications, such as traction drives, the maximum torque demand occurs at starting, which severely limits the utility of starting a synchronous machine by selectively pulsing the machine windings through the inverter. A further problem associated with synchronous motors is the requirement for rotor excitation, which necessitates either slip-rings or a complicated brushless system.

The aforementioned difficulties with synchronous motors illustrate the need in the art for the development of a novel AC motor drive system which provides the rugged construction of squirrel-cage motors and the simplicity of line-commutated inverters.

SUMMARY OF THE INVENTION

Accordingly, the present invention provides a variable-speed AC machine which may be supplied through a line-commutated inverter from a variable DC-link voltage source, such as a controlled rectifier or a chopper-type input inverter. The system is brushless, has a squirrel-cage rotor and produces high-starting torque. The invention is suitable for drives having power ratings up to several hundred horsepower and is suitable either for industrial, military or transit use.

The leading power factor induction motor drive comprises a main machine and a smaller auxiliary machine installed in a common housing. The rotors of the two machines are mounted on a common shaft, and both rotors are of a squirrel-cage construction. The rotor bars of the main machine and the auxiliary machine are concatenated at the adjoining ends and are connected to conventional end rings at the extremities. The main traction motor is supplied from a line-commutated inverter, and the auxiliary machine is supplied from an independent self-commutated inverter.

The main machine and the auxiliary machine in the completely brushless cascade configuration of the invention are electrically equivalent to two wound rotor induction motors which are mechanically coupled and electrically concatenated through slip rings. The two polyphase stator windings of the invention are electrically separate and each is supplied from a corresponding variable-voltage, variable-frequency inverter.

The system is described in terms of its operation as a motor, but like most electrical machines it can equally well be used in the generating mode.

DESCRIPTION OF THE PREFERRED EMBODIMENT

Figure 1:
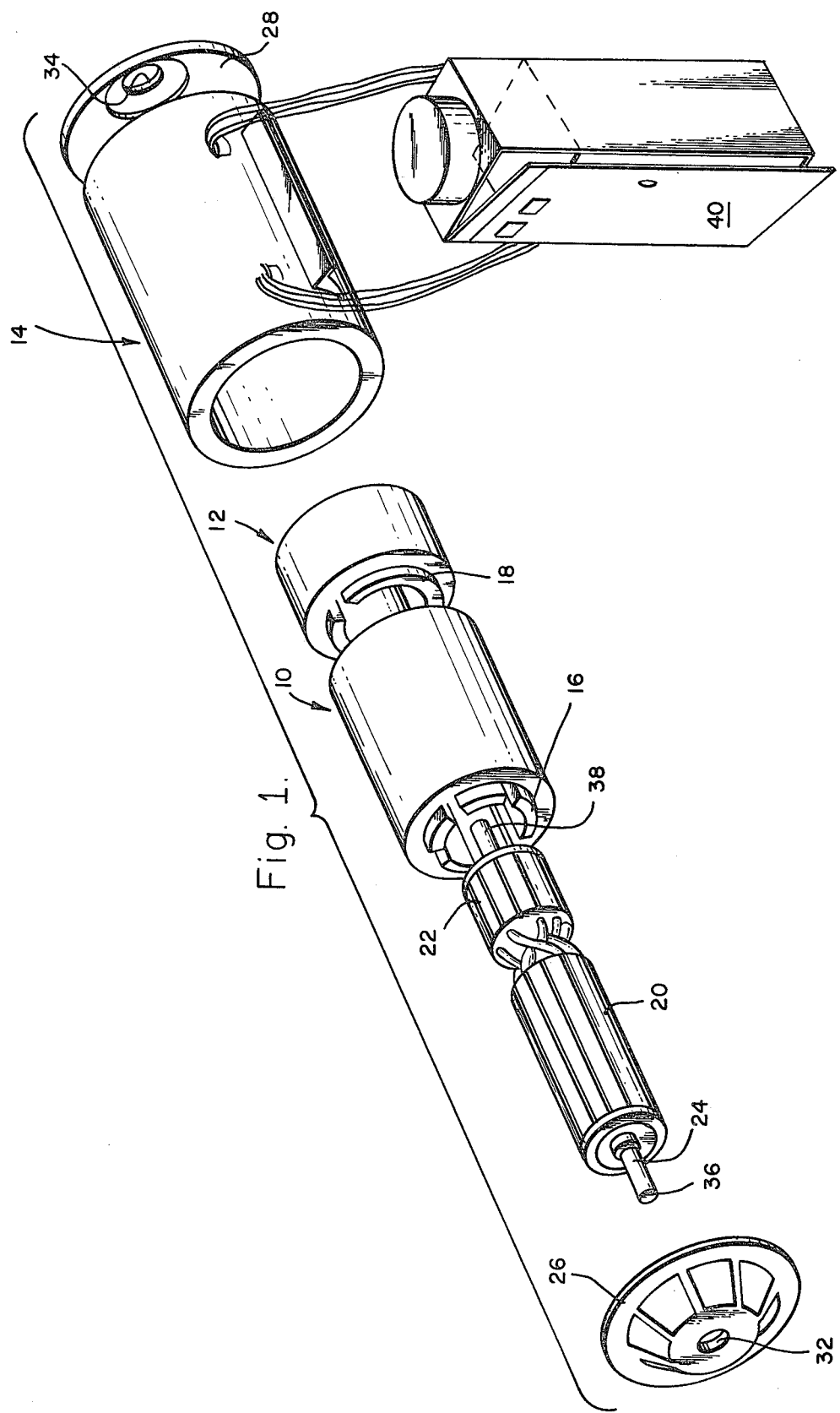
FIG. 1 is an exploded perspective view of the invention.

Referring to FIG. 1, the invention includes a main machine 10 and an auxiliary machine 12, which are installed in a common housing 14. Main machine 10 includes a main stator assembly 16 which includes a plurality of magnetic poles and auxiliary machine 12 includes an auxiliary stator assembly 18, which also includes a plurality of magnetic poles. Main machine 10 further includes a main rotor assembly 20 which is preferably of a squirrel-cage construction. Auxiliary machine 12 includes an auxiliary rotor assembly 22, also preferably of squirrel-cage construction; and main rotor assembly 20 and auxiliary rotor assembly 22 are mounted on a common rotor shaft 24.

Main rotor assembly 20 and auxiliary rotor assembly 22 are configured for insertion within main stator assembly 16 and auxiliary stator assembly 18, respectively. Rotor shaft 24 is rotatably mounted within housing 14 by a first end bell 26 and a second end bell 28, which are secured to the ends of housing 14 by appropriate fastening means. End bell 26 has an orifice 32 in the center portion thereof; and end bell 28 has an orifice 34 in the center portion thereof in alignment with orifice 32. When end bells 26 and 28 retain main machine 10 and auxiliary machine 12 within machine housing 14, one end 36 rotor of shaft 24 fits within orifice 32; and the other end 38 of rotor shaft 24 fits within orifice 34 through suitable bearings (not shown).

Still referring to FIG. 1, an inverter housing 40 contains a main inverter (not shown) and an auxiliary inverter (not shown), which are connected to the stators of main machine 10 and auxiliary machine 12, respectively, to supply electrical power thereto.

Figure 2:
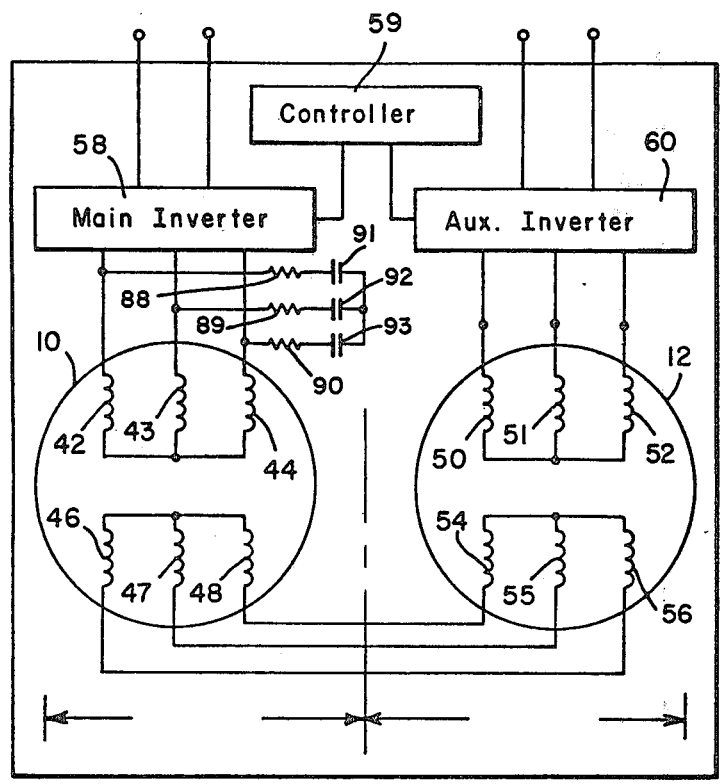
FIG. 2 is a simplified schematic diagram of the invention.
Figure 4:
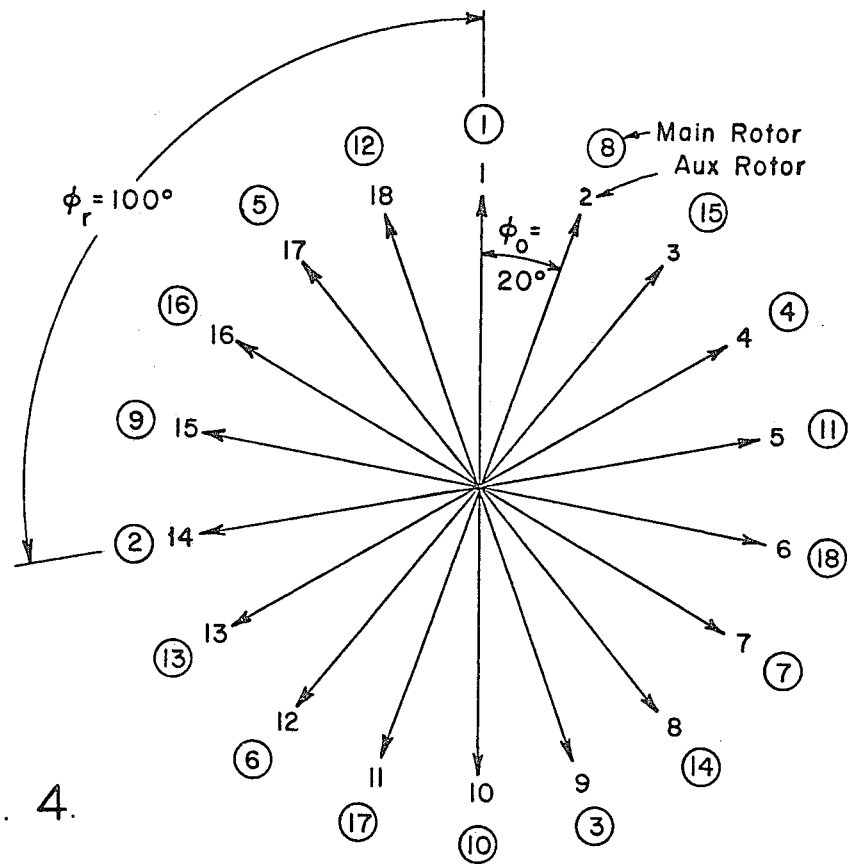
FIG. 4 illustrates phase relationships for the pole connections of FIG. 5.

Main machine 10 and auxiliary machine 12 in the illustrated brushless cascade configuration, are electrically equivalent to two wound rotor induction motors which are mechanically coupled and electrically concatenated through their slip rings, as illustrated schematically in FIG. 2. Main stator assembly 16 is represented by polyphase stator windings 42-44; and main rotor assembly 20 is represented by corresponding polyphase windings 46-48. Similarly, auxiliary stator assembly 18 is represented by polyphase stator windings 50-52; and auxiliary rotor assembly is represented by corresponding polyphase rotor windings 54-56. Main rotor windings 46-48 are electrically concatenated to auxiliary rotor windings 54-56, respectively. Main stator windings 42-44 are connected to a main inverter 58; and auxiliary stator windings 50-52 are connected to an auxiliary inverter 60. A controller 59 is connected between main inverter 58 and auxiliary inverter 60 to regulate the magnitude, frequency and phase of the outputs thereof.

The number of magnetic poles in main machine 10 and auxiliary machine 12 has an important effect on the overall size, weight and cost of the system. The axial lengths of main machine 10 and auxiliary machine 12 are approximately in the ratio of their respective pole numbers. The preferred embodiment includes a consequential pole change connection, which enables the construction of two concatentated squirrel-cage windings with the ability to select appropriate pole numbers on either machine. If wound rotor machines are used, then it is a simple matter to wind main rotor assembly 20 and auxiliary assembly 22 with the appropriate pole arrangement and pole pair numbers. One major advantage of using an induction motor is that the squirrel-cage rotor is extremely rugged. In order to construct a leading power factor induction motor wherein main rotor assembly 20 and auxiliary rotor assembly 22 comprise squirrel-cage rotors, it is necessary to interconnect the squirrel-cage rotor bars of main rotor assembly 20 and auxiliary rotor assembly 22 to produce the required pole arrangement on both machines. Consequential pole changing is accomplished by dividing the bars of main rotor assembly 20 and auxiliary rotor assembly 22 into N phase-band groups and by connecting each phase-band in auxiliary rotor assembly 22 to a corresponding phase-band in main rotor assembly 20 with the polarity of adjacent phase-bands being opposite. The effect of such connections is a pole-changing action, so that if auxiliary rotor assembly 22 has $P_a$ pole-pairs, then main main rotor assembly has $P_a - N/2$ pole-pairs. If $N/2$ is greater than $P_a$, the pole pair number of main rotor assembly 20 is negative, which produces a traveling wave of $P_a - N/2$ pole-pairs traveling in a negative direction relative to the direction of travel of the wave produced by the pole-pairs $P_a$ of auxiliary rotor 22. Thus an 18 phase-band auxiliary rotor assembly 22 and main rotor assembly 20 with auxiliary rotor assembly 22 having 3, 4, 5, or 6 pole-pairs could by a consequential pole-change on main rotor assembly 20 produce $-6$, $-5$, $-4$, and $-3$, pole pairs respectively. In a squirrel-cage winding, an effective reversal is achieved by transposing the interconnection between cages by an odd number of pole-pitches. For example, the number of phase-bands required to achieve a 1 to $-5$ consequential pole change is 12.

Figure 3:
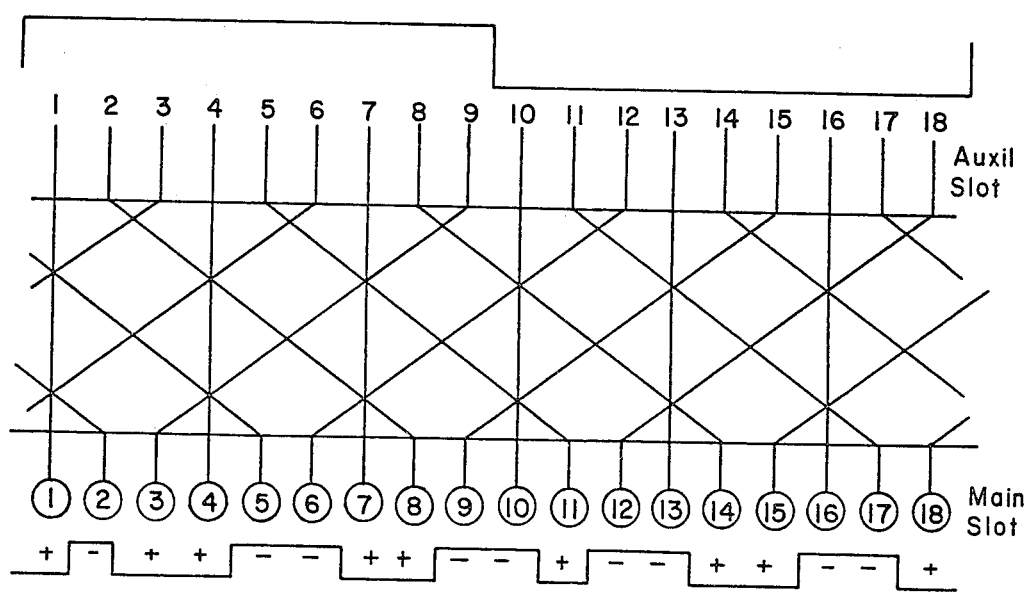
FIG. 3 illustrates a preferred consequential pole change connection between the main and auxiliary rotors of FIG. 1.
Figure 5:
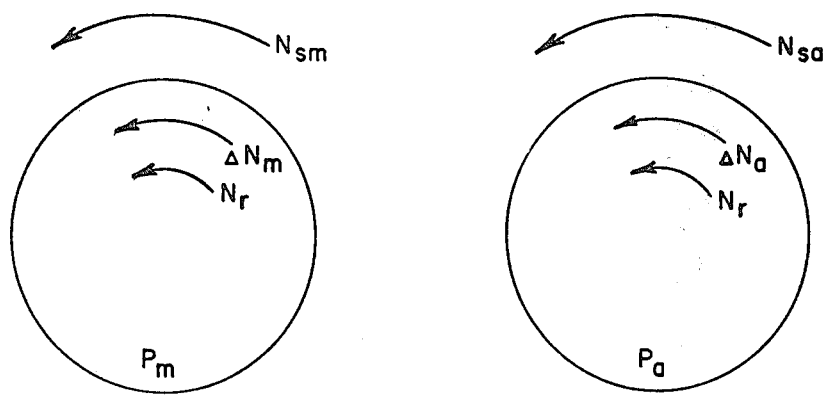
FIG. 5 illustrates the relationships between the rotating magnetic fields of the main machine and the auxiliary machine of FIG. 1.
Figure 6:
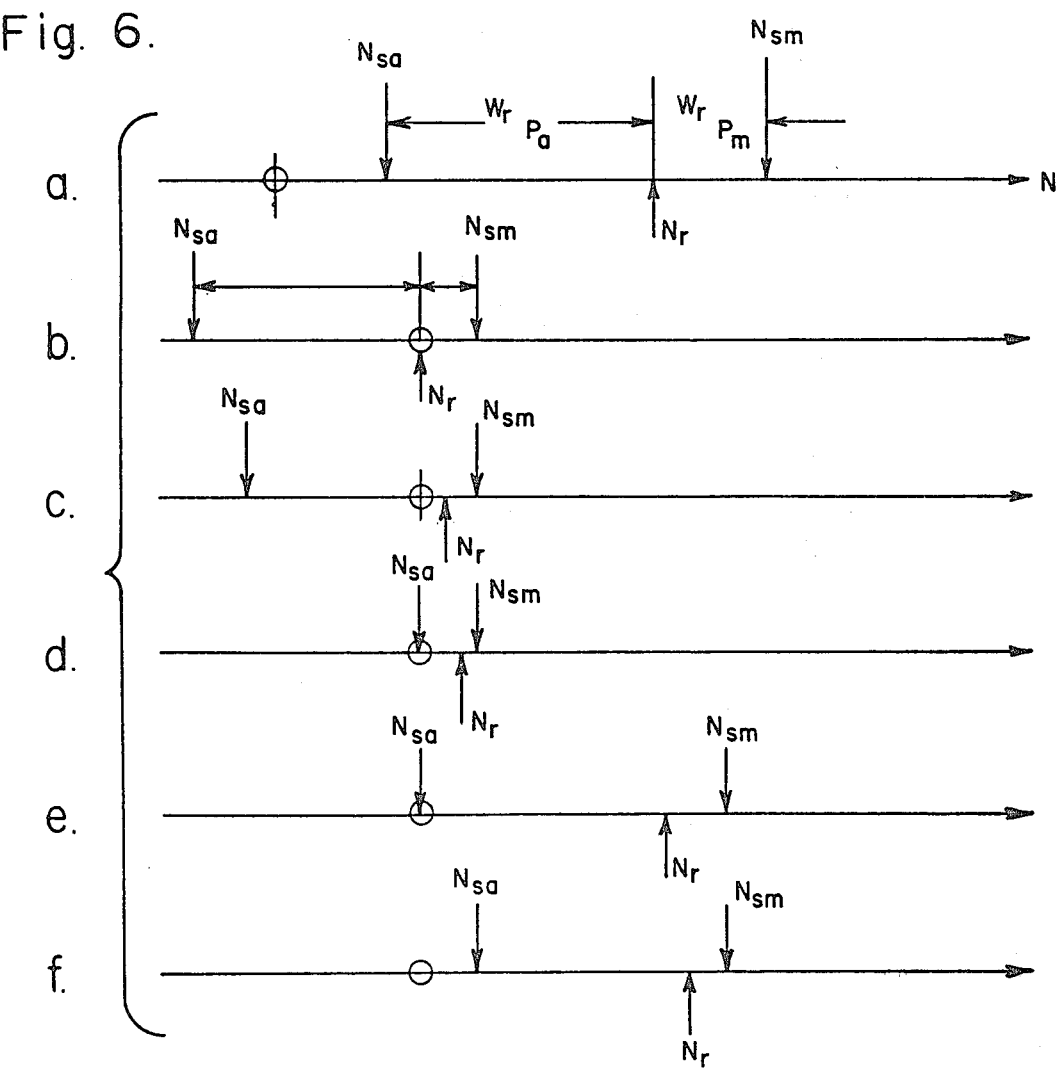
FIGS. 6A-6F illustrate relationships between the velocities of the rotating magnetic fields of the main machine and auxiliary machine of FIG. 1.

And interleaving technique as shown in FIG. 3 may be used to achieve a consequential pole-change connection between squirrel-cage rotors having more than a total of 12 bars. FIG. 5 illustrates a 1 to $-5$ pole-pair connection using 18 squirrel-cage rotor bars. As shown in FIG. 6, when auxiliary machine 12 has one pole pair, the phase shift per slot is 20°; and the phase shift per slot for the 5 pole-pair main machine 10 is 100°. Similar connections may be made to achieve a 1 to $-5$ pole pair change with squirrel-cage rotors having the number of bars therein equal to a multiple of 6. In general, for a $P_a$ to $P_m$ pole-pair change, wherein $P_a$ is the pole-pair number of auxiliary machine 12 and $P_m$ is the pole-pair number of main machine 10, the number of squirrel-cage rotor bars must be a multiple of $P_a + P_m$ in order for the interleaving connections to accomplish the desired pole-pair change.

Choice of $P_a$ and $P_m$ can be made to vary the relative axial lengths of the main and auxiliary machines. If, for example auxiliary machine 12 is a two-pole machine, the operating frequency of auxiliary machine 12 is low, and the reactive volt-ampere which must be supplied by auxiliary inverter 60 is also small. In order to minimize costs, the power rating of auxiliary inverter 60 should be as small as possible; and therefore the system is designed such that main inverter 58 supplies mainly the real power to main stator assembly 16, while auxiliary inverter 60 supplies a small volt-ampere value to magnetize both main machine 10 and auxiliary machine 12 and also supplies or accepts slip-power, less machine losses. Therefore, main inverter 58 may be a simple line-commutated unit, whereas auxiliary inverter 60 will usually require forced commutation. Both main inverter 58 and auxiliary inverter 60 are variable frequency, variable voltage inverters.

Operation of main machine 10 and auxiliary machine 12 is explained with reference to FIG. 5. The pole-pair number of main machine 10 is $P_m$, and the pole-pair number of auxiliary machine 12 is $P_a$. The relative phase sequence in main rotor assembly 20 is reversed from that of auxiliary rotor assembly 22. Therefore, a three-phase current $I_r$ at a frequency $w_r$ rad/sec flowing in main rotor assembly 20 produces an m.m.f. wave in main machine 10 which rotates at $+w_r/P_m$ rad/sec relative to main rotor assembly 20; and the same current produces an m.m.f. wave rotating at $-w_r/P_a$ relative to auxiliary rotor assembly 22. As an example, if main stator assembly 16 produces 10 poles and auxiliary stator assembly 18 produces 2 poles such that $P_m=5$ and $P_a=1$, current slowing in main rotor assembly 20 at a frequency of 5 Hz, with main rotor assembly 20 being stationary, produces a positive rotating m.m.f. wave in the air gap of main machine 10 at 60 rpm and a negative rotating m.m.f. wave at 300 rpm in the air gap of auxiliary machine 12. The ratio of the speeds of the rotating m.m.f. waves in the main machine 10 and auxiliary machine 12 will always be $P_a:P_m$. If rotor shaft 24 rotates at an angular velocity $N_r$, then the m.m.f. wave produced by currents in main rotor assembly 20 rotates at an angular velocity of $N_{sm}$ relative to main stator assembly 16; and the m.m.f. wave produced by currents in auxiliary rotor assembly 22 rotates at an angular velocity of $N_{sa}$ relative to auxiliary stator assembly 18. FIG. 6A illustrates the relationship between $N_{sa}$, $N_{sm}$ and $N_r$. It may be seen that the speed $N_r$ of rotor shaft 24 always divides the speed difference between $N_{sm}$ and $N_{sa}$ in the ratio of $P_a:P_m$.

It is well known that in an induction motor with a small air gap, the m.m.f.'s due to the rotor and stator windings will almost exactly oppose one another; and therefore, for the condition represented in FIG. 6A, the currents in main stator assembly 16 must produce an m.m.f. wave at a velocity $N_{sm}$ to oppose that in the main assembly 20 m.m.f.; and currents in auxiliary stator assembly 18 must produce an m.m.f. wave having a velocity $N_{sa}$ to oppose the m.m.f. in auxiliary rotor assembly 22. The m.m.f.'s produced by each of main stator assembly 16 and auxiliary stator assembly 18 are, therefore, completely interlinked; and if one of the m.m.f.'s is known, then the other three m.m.f.'s are defined thereby. Thus, if the phase of current in main stator assembly 16 is chosen to be unity power factor, then the magnitude and phase of current in main rotor assembly 20 must be such as to produce an m.m.f. wave opposing the m.m.f. of main stator assembly 16. Once the current in main rotor assembly 20 is known, the m.m.f. wave it produces in auxiliary rotor assembly 22 is defined; and the m.m.f. of auxiliary stator assembly 18 must oppose the m.m.f. of auxiliary rotor assembly 22, which defines both the magnitude and phase of current in auxiliary stator assembly 18. The flux density waves in main machine 10 and auxiliary machine 12 are coupled in a manner similar to that of the m.m.f. waves.

It can be shown that the following basic rule applies to the combination of main machine 10 and auxiliary machine 12:

Auxiliary power=(main input power
$X[(N_{sm}-N_r)/N_{sm}]$—rotor copper loss)
$X[N_{sa}/(N_r-N_{sa})]$.

The above equation shows that when $N_{sa}=0$, which is the condition for direct current flow in auxiliary stator assembly 18, there is no power transfer through auxiliary inverter 60 apart from copper loss in auxiliary stator assembly 18. In general, for low power transfer through auxiliary inverter 60, $N_{sa}$ and hence, the frequency of current in auxiliary inverter 60 should be kept as low as possible.

A major problem associated with line-commutated inverters is their inability to operate at low input line voltages, since low input line voltages are insufficient to commutate the current through thyristors which ordinarily comprise line-commutated inverters. Low input line voltages arise if the inverter is supplying a sychronous motor at zero or low speed because the generated line voltage reduces to zero when the rotor is stationary. One major advantage of the present invention over previously known motor drive systems is the ability to produce torque at motor standstill when main inverter 58 is operating at minimum frequency. In such a starting condition, the velocity of each field is represented in FIG. 6B. When the velocity $N_{sr}$ of rotor shaft 24 is zero, main stator assembly 16 produces a forward going wave having a velocity $N_{sm}$, which has a minimum operating velocity. Auxiliary inverter 60 must, therefore, produce a backward going wave having a velocity $N_{sa}=N_{sm}(P_m/P_a)$, which produces the excitation for both main machine 10 and auxiliary machine 12 and which therefore provides the voltage which line-commutates main inverter 58. Assuming that all the input power from main inverter 58 is not consumed in copper losses, the excess power is returned to auxiliary inverter 60; and the resultant reaction torque produces extra starting torque on auxiliary rotor assembly 22, thereby providing high starting torque at rated copper loss.

To accelerate rotor shaft 24, the frequency of current in auxiliary inverter 60 may be reduced as shown in FIG. 6C with the frequency of main inverter 58 being kept constant or alternatively the frequency of the main inverter can be increased keeping the auxiliary frequency constant. The speed of rotor shaft 24 may be determined since the speed difference between $N_{sm}$ and $N_{sa}$ is always divided in a constant ratio such that $N_{sm}-N_{sa}=P_a/P_m$. The condition when $N_{sa}$ is reduced to zero is shown in FIG. 6D. When $N_{sa}$ is zero, auxiliary inverter 60 provides direct current to auxiliary stator assembly 16 while all the power comes through main inverter 58. Further increases in rotor speed may be achieved by increasing the frequency of main inverter 58. FIG. 6E illustrates the case where the frequency of auxiliary inverter is kept at zero (dc) with no power transfer through auxiliary inverter 60. FIG. 6F illustrates the case where the frequency of auxiliary inverter 60 has increased to produce a positive-going wave wherein some of the power is supplied through auxiliary inverter 60. It is understood that to optimize the performance at any rotor speed an appropriate value of auxiliary and main frequency can be selected.

Figure 7:
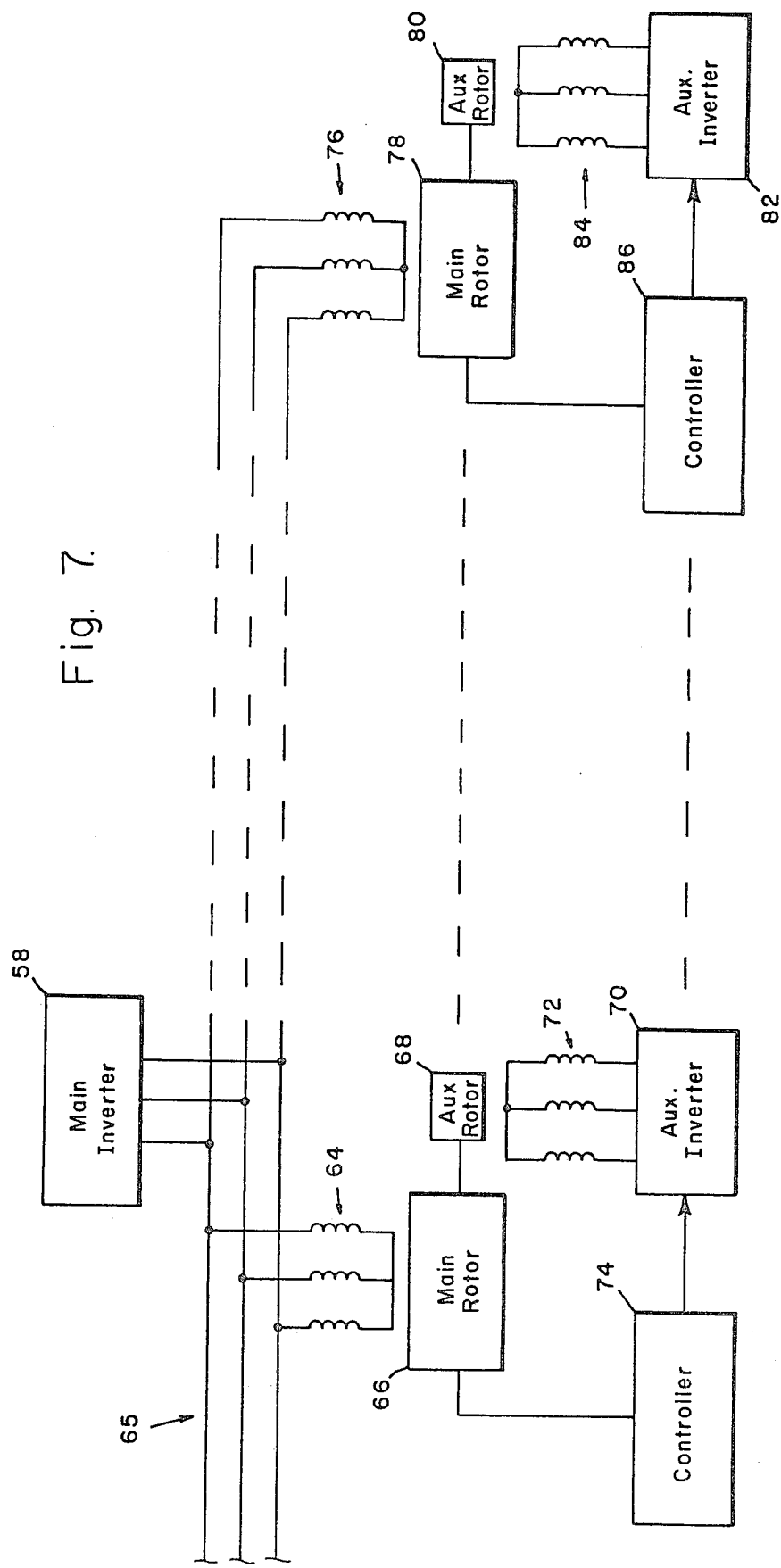
FIG. 7 is a schematic diagram illustrating the use of the invention in a multi-machine drive system.

FIG. 7 illustrates the use of the invention in a multimachine drive system. Main inverter 58 supplies three-phase power to a three-phase main stator winding 64 through a power line 65. The current in stator windings 64 produces a magnetic field which induces three-phase current in a main rotor 66, which is connected to an auxiliary rotor 68 as described previously with reference to FIGS. 1 and 5. An auxiliary inverter 70 provides three-phase power to a three-phase auxiliary stator winding 72; and the current therein causes a magnetic field which induces a current in auxiliary rotor 68. A controller 74 is connected between main rotor 66 and auxiliary inverter 70 to regulate the magnitude, frequency and phase of the alternating current output of auxiliary inverter 70. Similarly, a second main stator winding 76 is connected to three-phase power line 65 to receive electrical current from main inverter 58. A second main rotor 78, a second auxiliary rotor 80, a second auxiliary inverter 82, a second auxiliary three-phase stator winding 84, and a second controller 86 are connected together in the same manner as are main rotor 66, auxiliary rotor 68, auxiliary inverter 70, auxiliary three-phase stator windings 72 and slip controller 74, respectively. A plurality of machines can be connected to one main inverter in the manner described above. Each machine of a multi-machine drive system would have a main stator connected to power line 65 and a main rotor, auxiliary rotor, auxiliary inverter, auxiliary stator, and a controller connected as described hereinabove. The invention makes it possible to control the speed of rotors 66, 68 and 78, 80 along with the speeds of rotors of additional machines which may be connected to power line 65, without altering the main inverter frequency. In such a system, the speed of rotors 66, 68 may be varied by changing the phase and frequency of the current output by auxiliary inverter 70 to achieve a desired slip. The rotor speeds of additional machines which may be connected to power line 65 are controlled in like manner.

The leakage inductance of main machine 10 tends to degrade performance thereof during periods of commutation overlap. Referring again to FIG. 2, in order to reduce commutation reactance and thereby substantially eliminate commutation overlap, the invention may be include an inductor 88 having a first terminal thereof connected between main inverter 58 and stator winding 42 with an inductor 89 and an inductor 90 being similarly connected between main inverter 58 and stator windings 43 and 44, respectively. A capacitor 91 is connected to a second terminal of inductor 88, and a capacitor 92 and a capacitor 93 are similarly connected to inductors 89 and 90, respectively. The above-described method of connecting capacitors 91, 92 and 93 in parallel with main inverter 58 is referred to as capacitor-assisted line commutation. Inductors 88, 89 and 90 are connected in series with capacitors 91, 92, and 93, respectively to limit the rate of change with respect to time of the current therein.

Referring again to FIG. 1, an input of mechanical energy to shaft 24 which causes rotation thereof enables main machine 10 and auxiliary machine 12 to function as cascade-connected generators.

While the invention has been described in relation to a presently preferred embodiment thereof, those skilled in the art will recognize that variations of the preferred embodiment may be made to suit varying requirements within the scope of the invention.

What is claimed is:

1. An induction motor drive system comprising:
   a machine housing;
   a main machine mounted within said machine housing, said main machine including a main stator assembly and a main rotor assembly;
   a main inverter connected to said main stator assembly for supplying electric current thereto;
   an auxiliary machine mounted within said machine housing said auxiliary machine including an auxiliary stator assembly and an auxiliary rotor assembly, said auxiliary rotor assembly being connected to said main rotor assembly to permit electric current to flow therebetween; and
   an auxiliary inverter connected to said auxiliary stator for supplying electric current thereto whereby an electric current is induced in said auxiliary rotor, said induced current flowing from said auxiliary rotor assembly to said main rotor assembly to produce a voltage for line-commutating said main inverter.

2. An induction motor drive system according to claim 1 wherein said main rotor assembly and said auxiliary rotor assembly comprise squirrel-cage rotors.

3. An induction motor drive system according to claim 1 or claim 2 wherein said main inverter is a line-commutated inverter.

4. An induction motor drive system according to claim 3 wherein said auxiliary inverter is a forced-commutated inverter.

5. An induction motor drive system according to claim 3 wherein said auxiliary inverter provides slip power plus a magnetizing volt-ampere input to said main machine.

6. An induction motor drive system according to claim 3 wherein said main rotor assembly and said auxiliary rotor assembly are mounted on a common shaft.

7. An induction motor drive system according to claim 3 further including means for controlling commutation overlap of said main inverter.

8. An induction motor drive system according to claim 6 wherein the number of magnetic poles of said main rotor assembly can differ from the magnetic poles of said auxiliary motor assembly.

9. An induction motor drive system comprising:
   a main inverter;
   a plurality of main machines each including a main stator and a main rotor, said main stators being connected to said main inverter in parallel with one another;
   a plurality of auxiliary machines, each auxiliary machine having an auxiliary stator and an auxiliary rotor, one auxiliary machine corresponding to each main machine with corresponding main rotors and auxiliary rotors being connected together to permit electrical current to flow therebetween;
   a plurality of auxiliary inverters, each of said plurality of auxiliary inverters being connected to one of said plurality of auxiliary stators to supply electric current thereto; and
   a plurality of controllers, each of said pluralities of controllers being connected between the main rotor of one of said plurality of main machines and the auxiliary inverter which is connected to the corresponding auxiliary machine.

10. An electrical machine comprising:
    a machine housing;
    a squirrel-cage rotor mounted in said machine housing;
    a stator mounted in said machine housing in electromagnetic communication with said squirrel-cage rotor;
    an inverter connected to said stator; and means for providing reactive power to said squirrel-cage rotor to permit line commutation of said inverter.

11. A method of driving a line-commutated electrical machine having a squirrel-cage rotor, comprising the step of: delivering reactive power to the squirrel-cage rotor to permit commutation of the line-commutated inverter.

12. A method according to claim 11 wherein said delivering step includes developing torque for rotating the rotor of an auxiliary machine which delivers the reactive power requirement of said squirrel-cage rotor.

13. A method for driving an induction motor, comprising the steps of:

mounting a main rotor assembly and an auxiliary rotor assembly on a common shaft;

supplying electric current from a line-commutated-inverter to a main stator assembly, whereby a main rotor current is induced in the main rotor assembly, the main stator current and the main rotor current producing opposing m.m.f.'s to develop torque for rotating the main rotor;

supplying electric current from a forced-commutated-inverter to an auxiliary stator assembly, whereby an auxiliary rotor current is induced in the said auxiliary rotor assembly, the auxiliary stator current and the auxiliary rotor current producing opposing m.m.f.'s to develop torque on the auxiliary rotor; and connecting the main rotor assembly and the auxiliary rotor assembly together to permit electric current to flow therebetween, the auxiliary rotor current flowing through said main rotor assembly to provide the reactive power required thereby and to provide a voltage sufficient to insure line-commutation of the line-commutated-inverter.

* * * * *

UNITED STATES PATENT AND TRADEMARK OFFICE
CERTIFICATE OF CORRECTION

PATENT NO. : 4,445,081
DATED : April 24, 1984
INVENTOR(S) : Gabor Kalman, Graham W. McLean It is certified that error appears in the above-identified patent and that said Letters Patent are hereby corrected as shown below:

Column 6, lines 1-3 should read as

--Auxiliary power =
   (main input power $\times [N_{sm} - N_r)/N_{sm}] -$
   rotor copper loss $\times [N_{sa}/(N_r - N_{sa})]$).--

Signed and Sealed this

Sixth Day of November 1984

[SEAL]

Attest:

Attesting Officer

GERALD J. MOSSINGHOFF
Commissioner of Patents and Trademarks